United States Patent [19]
Lee

[11] Patent Number: 6,138,488
[45] Date of Patent: Oct. 31, 2000

[54] METHOD AND APPARATUS FOR FORMING A HEAT DISSIPATING ELEMENT

[75] Inventor: Shun-Jung Lee, Pan-Chiao, Taiwan

[73] Assignee: Hon Hai Precision Ind. Co., Ltd., Taipei Hsien, Taiwan

[21] Appl. No.: 09/191,261

[22] Filed: Nov. 12, 1998

[30] Foreign Application Priority Data

Nov. 11, 1997 [TW] Taiwan .................................. 86219055

[51] Int. Cl.⁷ .................................................... B21C 23/00
[52] U.S. Cl. .................................................. 72/254; 72/338
[58] Field of Search ........................ 72/254, 338; 29/557, 29/558; 83/56, 454, 821, 823

[56] References Cited

U.S. PATENT DOCUMENTS

| | | | |
|---|---|---|---|
| 4,056,026 | 11/1977 | Panaritis et al. | 83/454 |
| 4,879,891 | 11/1989 | Hinshaw | 72/254 |
| 5,072,640 | 12/1991 | Greve et al. | 83/454 |
| 5,709,138 | 1/1998 | Rimer | 83/454 |
| 5,774,964 | 7/1998 | Fisher et al. | 72/254 |
| 5,832,804 | 11/1998 | Dudley et al. | 83/454 |

*Primary Examiner*—Ed Tolan

[57] ABSTRACT

An apparatus and a method for producing a heat dissipating element having a multiplicity of pins arranged in parallel rows and columns in longitudinal and transverse directions from a generally longitudinally extending extruded member having a base and a number of transversely spaced longitudinally extending ribs on the base. A cover frame having a number of transversely spaced longitudinal grooves is placed over ribs to establish a supporting relationship between the cover frame and the free ends of the ribs. The support provided by the cover frame to the ribs facilitates a subsequent cutting operation by a cutting tool on the ribs, thereby obviating potential damage to the ribs.

12 Claims, 6 Drawing Sheets

METHOD AND APPARATUS FOR FORMING A HEAT DISSIPATING ELEMENT

BACKGROUND OF THE INVENTION

The present invention relates to a process and an apparatus for forming a heat dissipating element such as a semi-conductor heat sink.

U.S. Pat. No. 4,879,891 issued to Hinshaw on Nov. 14, 1989 discloses a process for forming a semi-conductor heat sink by cross-cut gang sawing, in a transverse direction, a longitudinally extending profiled extruded metal member in order to enhance the heat dissipating efficiency of the heat sink. The extruded member comprises a longitudinally extending sheet-form member having a plurality of longitudinally extending and transversely spaced ribs positioned thereon. By cross-cut sawing the ribs depthwise in a transverse direction along a length thereof and then parting off a predetermined length from a processed portion of the extruded member, a semi-conductor heat sink comprising a base member having a plurality of transversely spaced rows of longitudinally extending rib portions is formed. With a ratio of the height of the ribs to the spacing dimension between the ribs of at least six to one, sharp burrs might be created on the sawn edges during cross-cutting of the ribs, which must be removed before the heat sink can be utilized. Furthermore, as illustrated in FIG. 6, the rib 53 first approached and sawn by a cutting tool 62 is apt to break at location 54.

U.S. Pat. No. 5,572,789 issued to Fisher et al. on Nov. 12, 1996 discloses a process for forming a profiled element from a longitudinally extending extruded member having a plurality of transversely spaced longitudinally extending ribs projecting therefrom. In this process, longitudinally extending, spaced apart portions are removed from at least some of the ribs by means of a transversely acting punching means to produce a profiled element in which the rib portions of adjacent ribs are staggered, i.e., not in transverse alignment.

The present invention aims to obviate the disadvantage of the above mentioned defects associated with the cross-cut gang sawing of ribs.

BRIEF SUMMARY OF THE INVENTION

One object of the present invention is to provide a method for forming a heat dissipating element from a generally longitudinally extending extruded member having a plurality of transversely spaced, longitudinally extending ribs, the method comprising the steps of:

supportably covering a cover frame transversely over the extruded member; and advancing a cutting tool transversely across the extruded member to form the heat dissipating element.

Another object of the present invention is to provide an apparatus for supporting a generally longitudinally extending extruded member having a plurality of transversely spaced, longitudinally extending ribs to produce a heat dissipating element having a multiplicity of pins arranged in parallel rows and columns in longitudinal and transverse directions, the apparatus comprising:

means for engaging a first part of free ends of the extruded member ribs and for permitting access to a second part of the free ends of the extruded member ribs; and a cutting tool for cutting at least a portion of the second part of the extruded member ribs.

A further object of the present invention is to provide an apparatus for supporting a generally longitudinally extending extruded member having a base and a plurality of transversely spaced longitudinally extending ribs projecting from the base to produce a heat dissipating element having a multiplicity of pins arranged in parallel rows and columns in longitudinal and transverse directions, the apparatus comprising:

a support frame restraining the extruded member from lateral movement in a direction perpendicular to the longitudinal direction;

a cover frame covering the extruded member, the cover frame defining, on an inner face thereof, a plurality of transversely spaced longitudinal grooves for supportably receiving a respective free end of the ribs and a plurality of longitudinally spaced transverse passages exposing a portion of each of ribs; and a cutting tool for advancing through at least one of the passages to cut the exposed portions of the ribs.

Other objects, advantages and novel features of the invention will become more apparent from the following detailed description when taken in conjunction with the accompanying drawings.

DETAILED DESCRIPTION OF THE INVENTION

Figure 1:
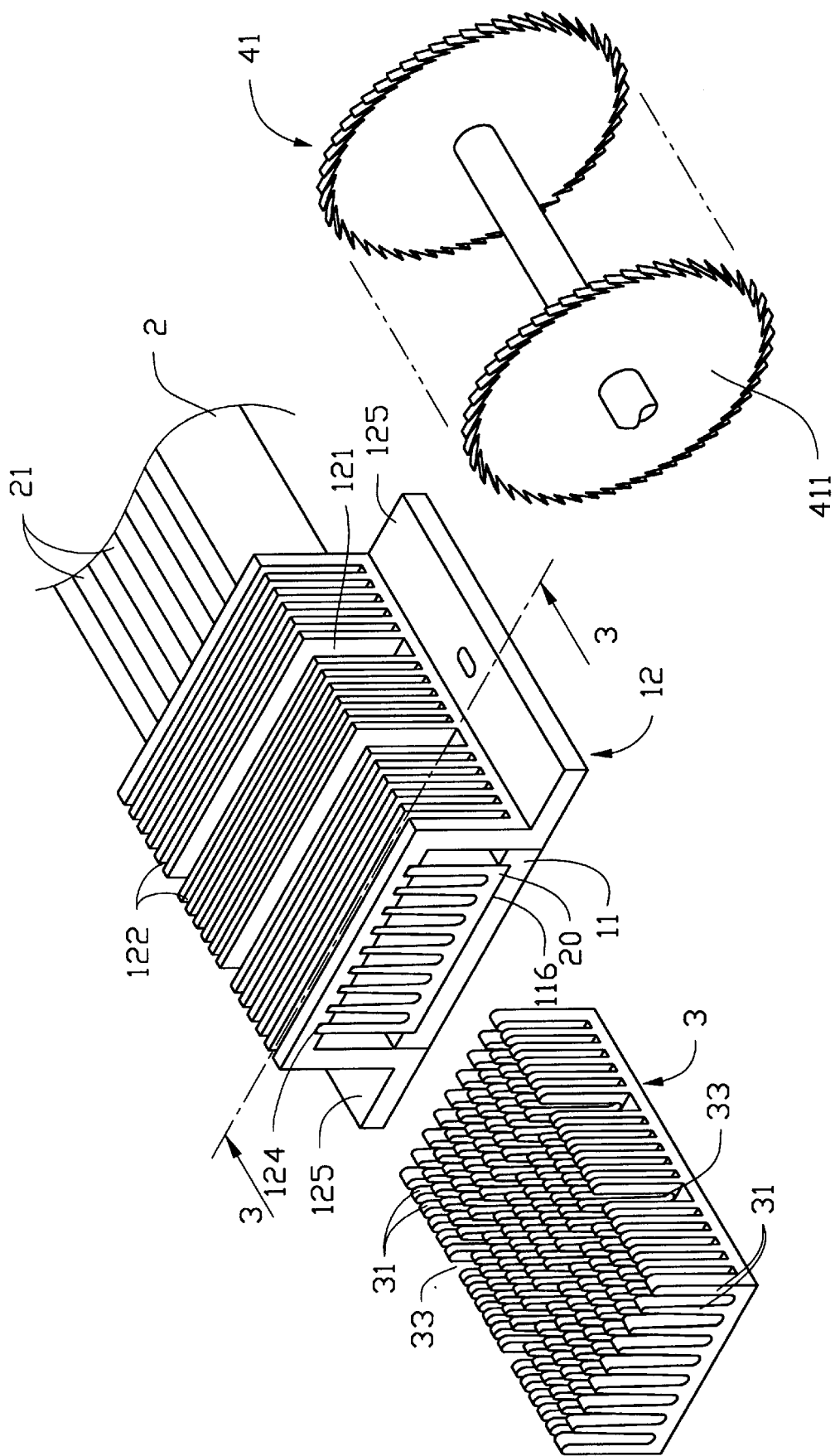
FIG. 1 is a perspective view of an apparatus in accordance with the present invention.
Figure 2:
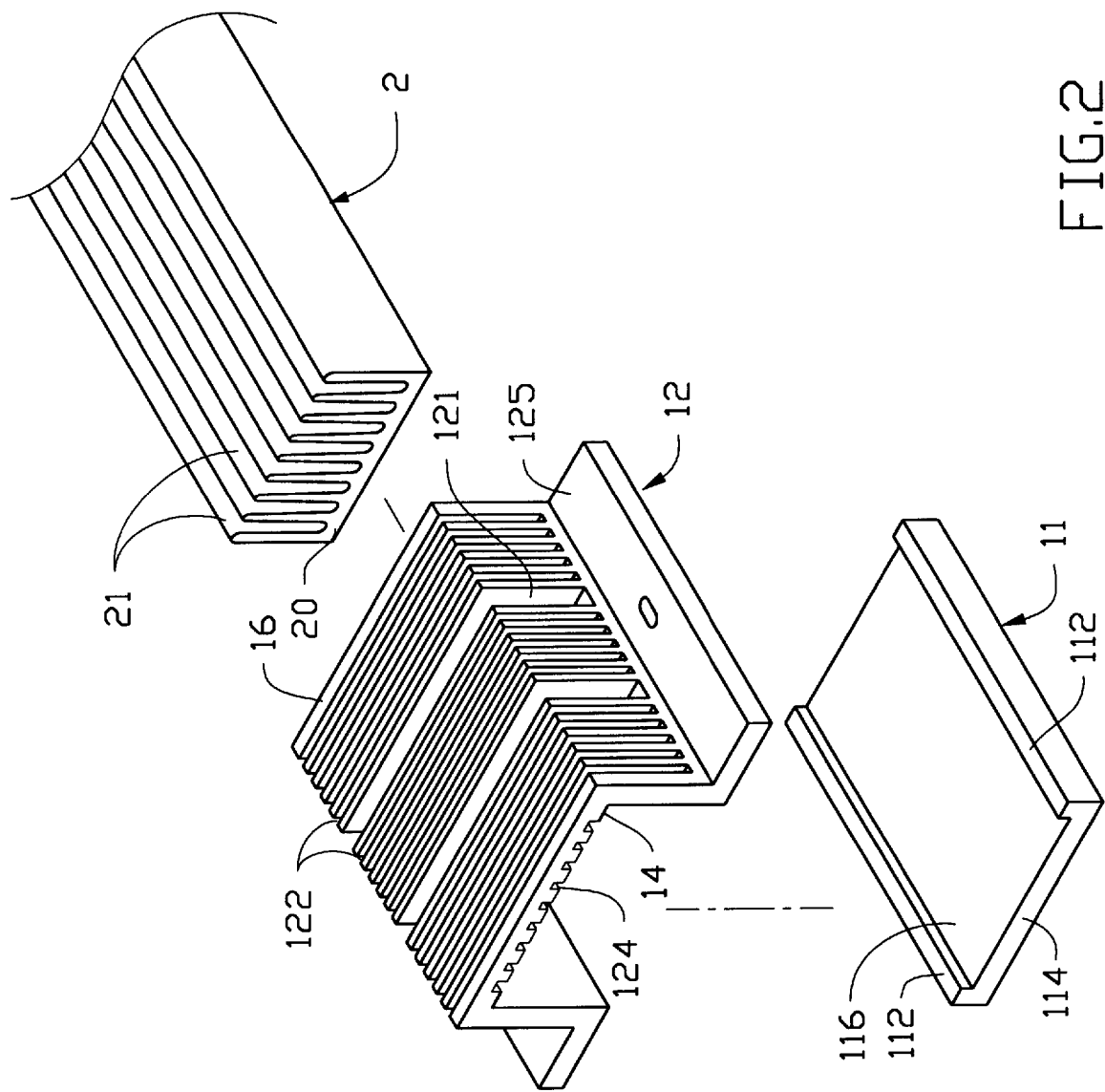
FIG. 2 is an exploded view showing a cover frame and a support frame constructed in accordance with the present invention.
Figure 3:
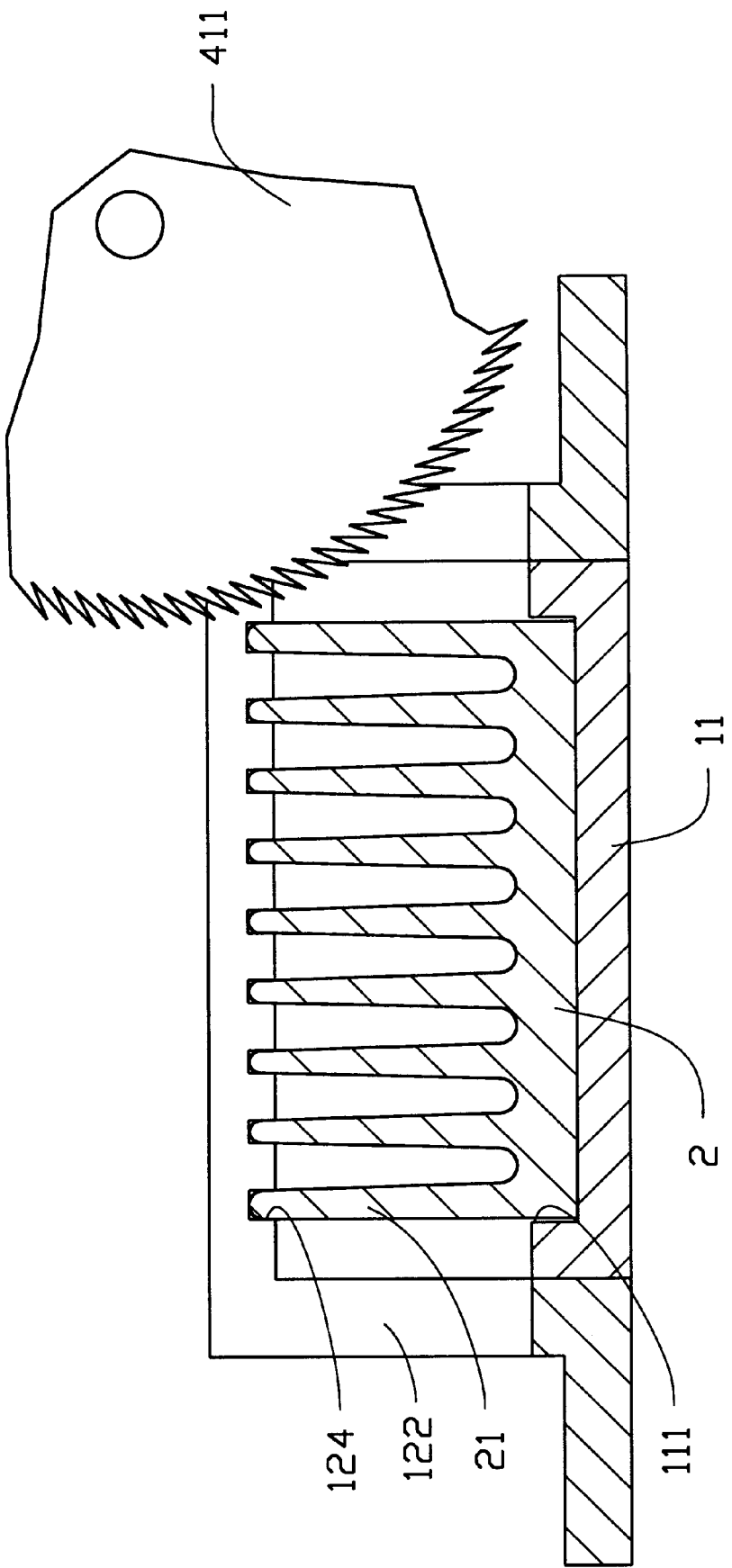
FIG. 3 is a cross-sectional view taken along line 3—3 of FIG. 1.

Referring to FIGS. 1–3, an apparatus for supporting a generally longitudinally extending extruded member 2 to produce a heat dissipating element 3 is shown. The extruded member 2 has a base 20 with a plurality of transversely spaced longitudinally extending ribs 21 projecting from the base 20. The resulting heat dissipating element 3 will have a multiplicity of pins 31 arranged in parallel rows and columns in longitudinal and transverse directions. The apparatus in accordance with the present invention essentially comprises a cover frame 12 and a cutting tool 41. The cover frame 12 defines, on an inner face 14 thereof, a plurality of transversely spaced longitudinal grooves 124 engaging respective free end of the ribs 21 of the extruded member 2. The cover frame 12 further defines a plurality of longitudinally spaced transverse passages 122 which exposes a portion of each of the ribs 21.

In the embodiment shown, the cover frame 12 consists of a pair of anchoring wings 125 and a substantially inverted U-shaped central portion 16. The longitudinal grooves 124 are disposed on a bottom face of the central portion 16 and the transverse passages 122 are disposed across a top face of the central portion 16. The cover frame 12 thus serves to engage a first part of free ends of the ribs 21 and to permit access to a second part of the free ends of the ribs 21 for subsequent cutting operation by the cutting tool 41. The cutting tool 41 can then cut the exposed portions of each of the ribs 21 through one or more of the transverse passages 122 of the cover frame 12.

To enable a relative longitudinal sliding movement between the cover frame 12 and the extruded member (and therefore the resulting heat dissipating element 3), a support frame 11 may be suitably provided. The support frame 11 forms a pair of side wings 112 and an intermediate web 114 defining a recess 116 sized for receiving the base 20 of the extruded member 2. The support frame 11 thus serves to restrain the extruded member 2 from a lateral movement in a transverse direction perpendicular to the longitudinal direction. With the extruded member 2 being covered by the cover frame 12 and supported by the support frame 11, the cutting tool 41 can advance through one or more passages 122 of the cover frame 12 to cut the exposed portions of each of the ribs 21 quickly and without fear of damaging the ribs 21.

As clearly seen in FIGS. 1 and 3, the cutting tool 41 may suitably consist of a plurality of saw blades 411 for effectuating a simultaneous advance through the corresponding number of passages 122 of the cover frame 12 to remove the exposed portion of the ribs 21. If desired, the cutting tool 41 may include extra saw blades 411 adapted to cut one or more grooves 33 having a larger width than the other grooves 33. The wider grooves 33 can be used to accommodate any suitable fastening means (not shown) for securing the finished heat dissipating element 3 to a semiconductor device (not shown). As a result, the passages of the cover frame 12 may comprise a first group of passages 122 of a given width and a second group of passages 121 of a larger width.

Figure 4:
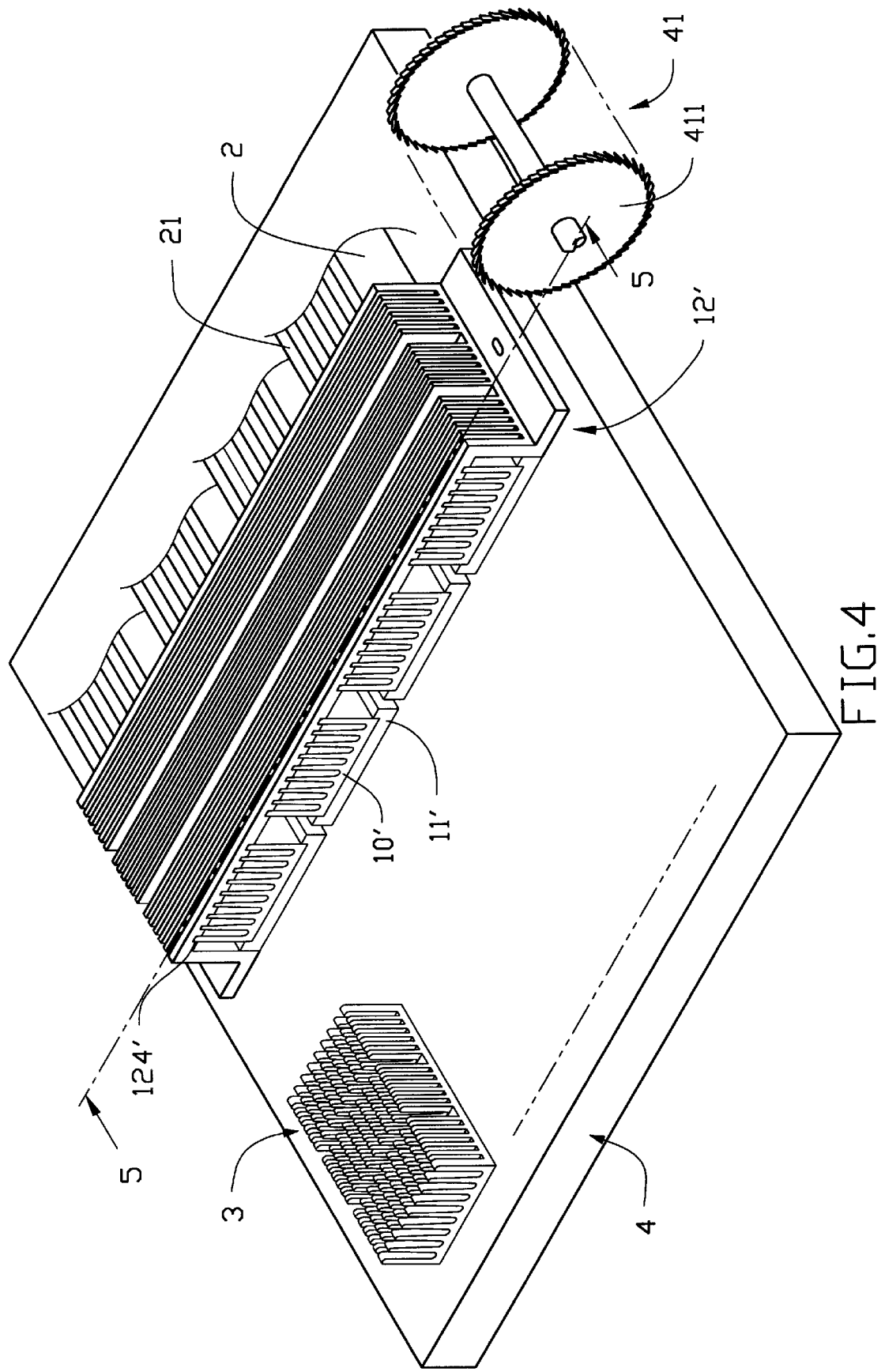
FIG. 4 is a perspective view of an apparatus in accordance with another embodiment of the present invention.
Figure 5:
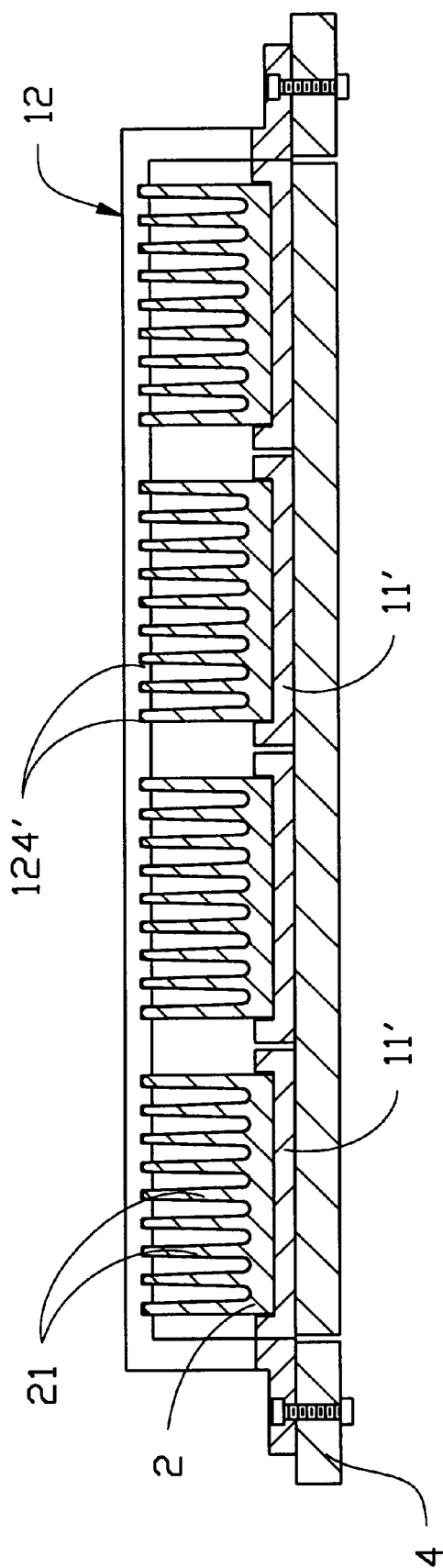
FIG. 5 is a cross-sectional view of taken along line 5—5 of FIG. 4.
Figure 6:
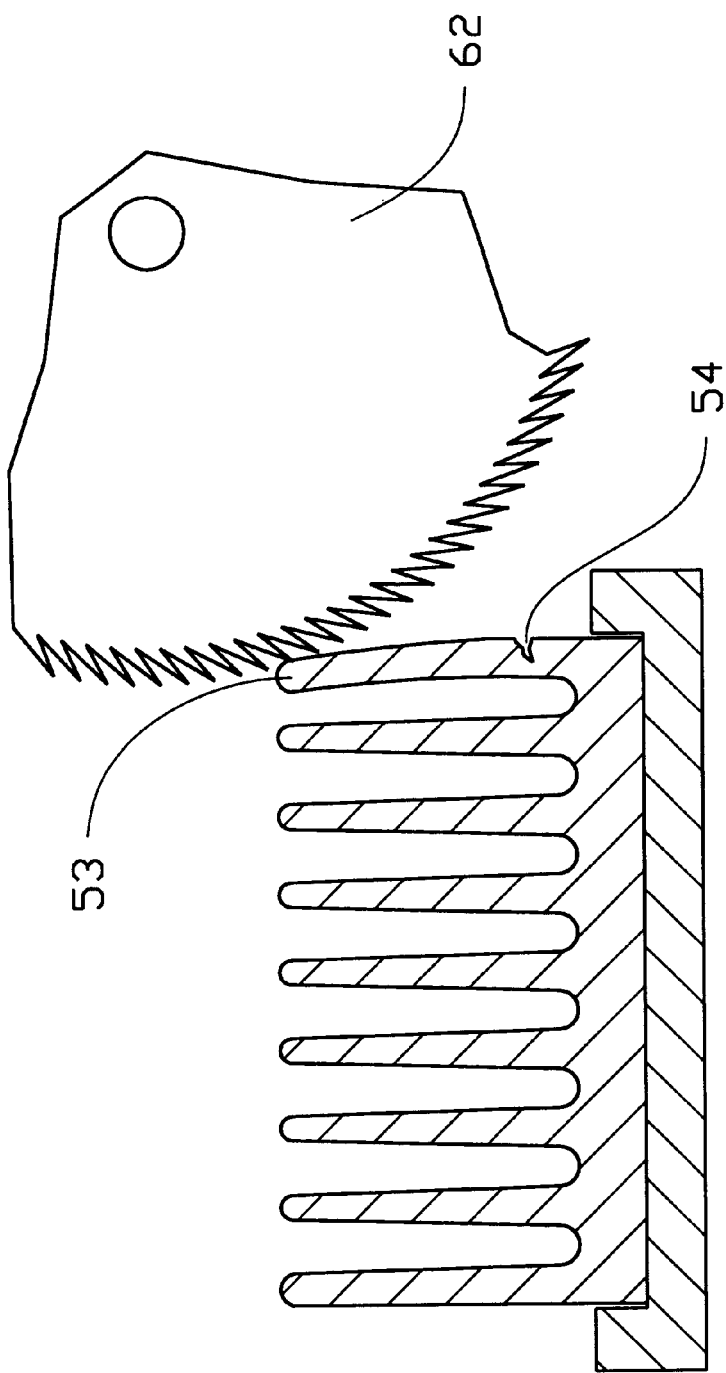
FIG. 6 shows a prior art apparatus.

In accordance with a second embodiment of the present invention as clearly shown in FIG. 4, an elongate cover frame 12' extending along a transverse direction defines a number of sets of transversely spaced longitudinal grooves 124' on a bottom surface thereof for accommodating a corresponding number of generally longitudinally extending extruded members 2 to simultaneously produce a number of heat dissipating elements 3 after receiving an operation from a cutting tool 41. In this arrangement, a number of support frames 11' may be provided for slidably receiving respective bases 10' of the extruded members 2. FIG. 4 also shows a working table 4. The working table 4 provides a forum for suitably positioning, coupling, interconnecting, etc. the cover frame, the support frame, the cutting tool and the extruded member.

With the construction and arrangement of the invention described above, the method for forming a heat dissipating element from a generally longitudinally extending extruded member having a plurality of transversely spaced longitudinally extending ribs, in accordance with the present invention, comprises the steps of firstly placing or covering the cover frame 12 or 12' transversely over the extruded member(s) 2. The extruded member(s) 2 firmly supports the cover frame 12 or 12' and restrains the free ends of the extruded member ribs 21 from transverse movement for facilitating subsequent cutting operation. Then, the cutting tool 41 is advanced transversely across the extruded member 2 resulting in the heat dissipating element 3. The extruded member 2 can be suitably cut and separated from the produced heat dissipating element 3.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

I claim:

1. A method for forming a heat dissipating element from a generally longitudinally extending extruded member forming a plurality of transversely spaced longitudinally extending ribs, the method comprising the steps of:

preparing a cover frame defining a plurality of transversely spaced longitudinal grooves on an inner face thereof and a plurality of longitudinal spaced, transverse passages;

supportedly engaging the longitudinal grooves of the cover frame with respective free end of the extending ribs of the extruded member; and advancing a cutting tool transversely across the passages of the cover frame of the extruded member to form the heat dissipating element.

2. The method as claimed in claim 1, further comprising the step of cutting the extruded member to a desired length after the heat dissipating element is formed by the step of advancing.

3. An apparatus for supporting a generally longitudinally extending extruded member having a plurality of transversely spaced, longitudinally extending ribs to produce a heat dissipating element having a multiplicity of pins arranged in parallel rows and columns in longitudinal and transverse directions, the apparatus comprising:

means for engaging a first part of free ends of the ribs and for permitting access to a second part of the free ends of the ribs; and a cutting tool for cutting at least a portion of the second part of the ribs.

4. The apparatus as claimed in claim 3, wherein the means for engaging and for permitting access comprises a cover frame covering the extruded member, the cover frame defining, on an inner face thereof, a plurality of transversely spaced longitudinal grooves engaging respective free ends of the ribs and a plurality of longitudinally spaced, transverse passages exposing a portion of each of the ribs.

5. The apparatus as claimed in claim 3, further comprising a support frame for permitting a longitudinal sliding movement of the cover frame with respect thereto.

6. An apparatus for supporting a generally longitudinally extending extruded member having a base and a plurality of transversely spaced, longitudinally extending ribs projecting from the base to produce a heat dissipating element having a multiplicity of pins arranged in parallel rows and columns in longitudinal and transverse directions, the apparatus comprising:

a support frame restraining the extruded member from lateral movement in a direction perpendicular to the longitudinal direction;

a cover frame covering the extruded member, the cover frame defining, on an inner face thereof, a plurality of transversely spaced longitudinal grooves receiving a respective free end of the ribs and a plurality of longitudinally spaced transverse passages exposing a portion of each of the ribs; and a cutting tool for advancing through at least one of the passages to cut the exposed portions of the ribs.

7. The apparatus as claimed in claim 6, wherein the support frame comprises a pair of side wings and an intermediate web defining a recess sized for receiving the base of the extruded member.

8. The apparatus as claimed in claim 6, wherein the cover frame comprises a pair of anchoring wings and a substantially inverted U-shaped central portion, the grooves being disposed on a bottom face of the central portion and the passages being disposed across a top face of the central portion.

9. The apparatus as claimed in claim 6, wherein the passages of the cover frame comprises a first group of passages of a given width and a second group of passages of a width larger than the width of the first group passages.

10. The apparatus as claimed in claim 6, wherein the cutting tool comprises a plurality of saw blades for simultaneously advancing through a corresponding number of passages.

11. A process of making a heat dissipating element having a multiplicity of pins arranged in parallel rows and columns in longitudinal and transverse directions, said process comprising the steps of:
 (a) forming an extruded member with a plurality of transversely spaced longitudinally extending ribs by extrusion along a longitudinal direction;
 (b) providing each of the ribs with external individual support; and
 (c) advancing a cutting tool transversely across the extruded member to form said pins of the heat dissipating element.

12. The process as claimed in claim 11, wherein said external support is applied to free ends of the ribs.

\* \* \* \* \*